A. A. LAPOINTE.
AUTOMATIC FRICTION WHEEL SHIFTER.
APPLICATION FILED FEB. 15, 1911.

1,006,957.

Patented Oct. 24, 1911.

Witnesses:
Nathan C. Lombard
Mary C. Smith

Inventor:
Albert A. Lapointe,
by Walter E. Lombard
Atty.

UNITED STATES PATENT OFFICE.

ALBERT A. LAPOINTE, OF HUDSON, MASSACHUSETTS.

AUTOMATIC FRICTION-WHEEL SHIFTER.

1,006,957.

Specification of Letters Patent. Patented Oct. 24, 1911.

Application filed February 15, 1911. Serial No. 608,805.

*To all whom it may concern:*

Be it known that I, ALBERT A. LAPOINTE, a citizen of the United States of America, and a resident of Hudson, in the county of Middlesex and State of Massachusetts, have invented certain new and useful Improvements in Automatic Friction-Wheel Shifters, of which the following is a specification.

This invention relates to devices for the transmission of power but more particularly to such forms as are adapted for use in connection with motor vehicles and the like.

The object of this invention is to provide a simple, efficient, and inexpensive transmission mechanism which may be easily operated to vary the speed and which will produce a smooth and steady movement of the vehicle.

One feature of the invention is the sliding motion transmitting member which is adapted to contact with a rotary friction disk to operate the driven shaft combined with a governor for controlling the movement of this sliding member.

A further feature is the tension regulating device which permits the governor to be adjusted.

Heretofore numerous devices have been constructed with a rotary disk but these have never been arranged to act with a change speed device in which not only forward but reverse drive must be secured, and their whole function has been to obtain a uniform speed for a shaft driven by a variable speed member.

In the present invention, a transmission mechanism is devised whereby an increase in the speed of the driving member causes the driven member coacting therewith to be automatically moved across the face thereof, and the speed of the driven member thereby increased more than was the speed of the driving member. As the speed of the driving member decreases, the driven member is gradually returned to its normal position.

The invention consists in certain novel features of construction and arrangement of parts which will be readily understood by reference to the description of the drawings and to the claims hereinafter given.

Figure 1:
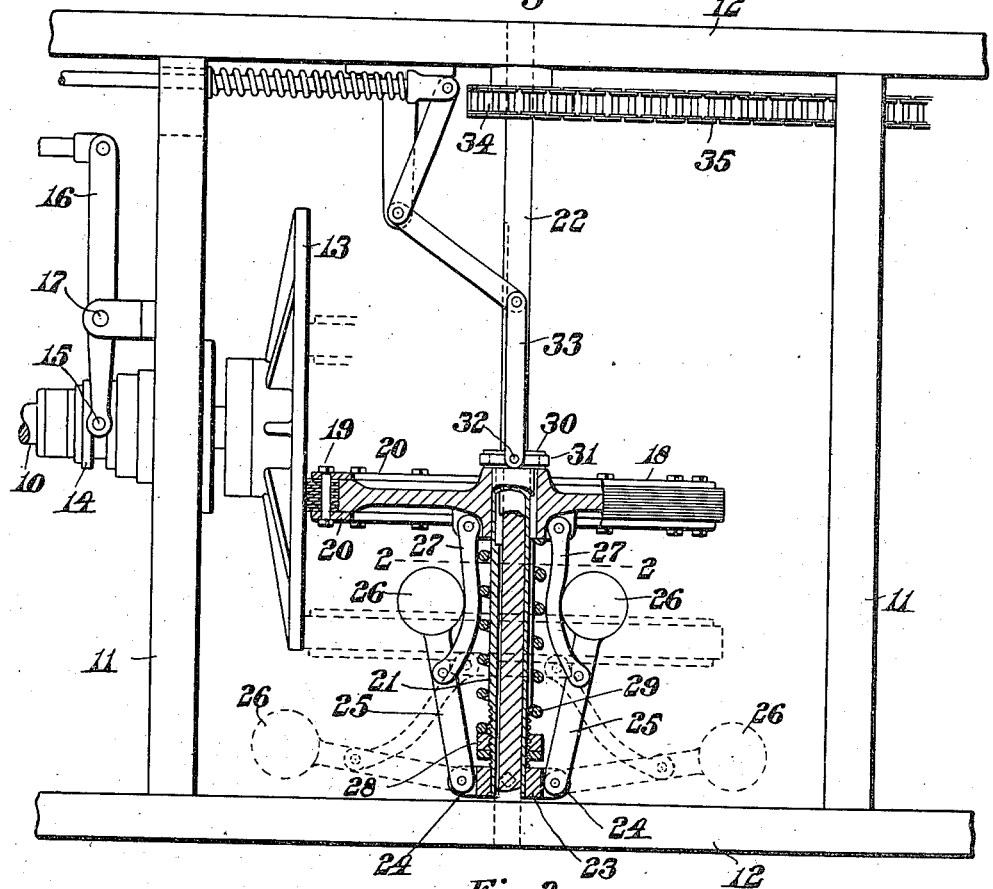
Figure 2:
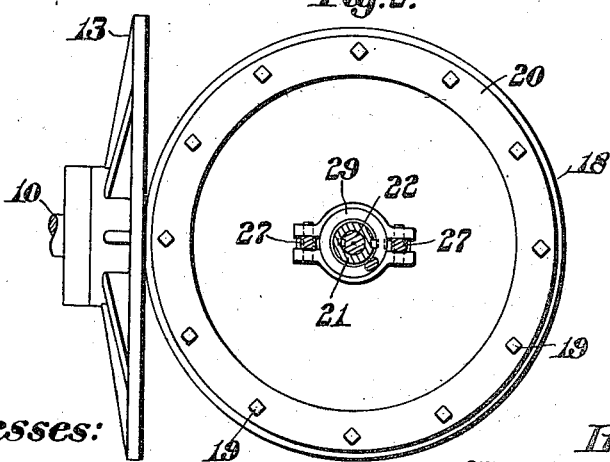

Of the drawings: Figure 1 is a plan view of a portion of a motor vehicle frame in which is mounted the invention, and Fig. 2 is a section on the line 2—2 of Fig. 1.

Similar characters designate like parts throughout the several figures of the drawings.

Referring to the drawings, the driving shaft 10 is mounted on one of the cross frames 11 which connect the side frames 12 and upon the extremity of this shaft 10 is mounted the friction disk 13. Secured to this shaft 10 is the collar 14 in an annular groove in which operates the pin 15 carried by the controlling arm 16 pivoted at 17 to the frame 11. The disk 13 is adapted to be advanced into contact with the periphery of the motion transmitting member 18 or to be withdrawn from this position by means of the arm 16 which is connected by suitable links to an operating lever or treadle. The member 18 is constructed preferably with its periphery composed of high friction material in order that it may firmly engage the face of the disk 13. In the present embodiment, this friction material is secured to the wheel by means of the bolts 19 passing through the side plates 20. This member 18 is slidably mounted upon the sleeve 21 on the driven shaft 22. This sleeve 21 is splined upon the shaft 22 so that it may slide longitudinally but be incapable of relative revolution thereon. At one extremity of the sleeve 21 is a member 23 provided with lugs 24 on opposite sides thereof, and to each of these lugs is pivoted a governor arm 25 having a weight 26 on its outer extremity. Links 27 connect each of these arms 25 with the member 18.

Upon the sleeve 21 between the fixed member 23 and the member 18 is a threaded collar 28 forming a tension regulator for the spring 29 which acts between the member 18 and the collar 28 to oppose the action of the arms 25 which with the weights thereon will be referred to as the governors 25. On the opposite end of the sleeve from the member 23 is an annular groove 30 in which operates a collar or band 31 connected by pin 32 with the link 33. This link 33 is connected by suitable link mechanism with a controlling lever of the usual type to permit the sleeve to be moved in such a manner as to shift the member 18 into the forward or reverse positions. The shaft 22 is provided with a sprocket 34 upon which operates a wheel driving chain 35.

In starting the machine, the member 18 is preferably set in its normal forward position, and the disk, driven preferably at a low rate of speed, is thrown into contact with the periphery of the member 18, thus starting the rotation of this member. When it is desired to increase the speed of the vehicle, the speed of the disk should be increased by increasing the speed of the engine. As the speed of the disk increases, the speed of the member 18 is also increased, and the governor 25 draws this member outwardly on the shaft, causing the driven member to engage the disk at a point more distant from the center of the latter, and thus the speed of the driven member is automatically increased more than was the speed of the driving member. When the vehicle encounters a hill, mud, sand, or the like, it will naturally be slowed down, causing the governor to be drawn inwardly by the action of the spring 29 and the member 18 to be pushed toward the center of the driving disk. Thus the transmission automatically moves from the high to the low speed, and will, in the same manner, move the opposite way when the top of the hill is reached. By slowing down the engine the result is the same as was automatically produced when the vehicle was climbing a hill. In coasting down hill, the governor would remain at the high speed position, so that when the power is applied, the member 18 would be properly located.

It will thus be seen that the transmission mechanism operates automatically, or it may be regulated by the increasing or decreasing of the speed of the engine. The only time that it is necessary to operate control levers is in moving from the forward speed to the reverse, or in throwing the disk into or out of contact with the member 18. In the reverse position the governor acts to maintain the speed of the shaft constant.

The applicant is aware that a great number of changes in the construction and mode of operation of the device could easily be made by any one skilled in the art without departing from the scope of his invention, and therefore he does not care to be limited to the particular embodiment herein shown and described.

It is believed that the operation and many advantages of the invention will be thoroughly understood without any further description.

Having thus described my invention, I claim:

1. In a device of the class described, the combination of a rotary driving disk; a shaft to be driven; a rotary motion transmitting member slidable on said shaft and adapted to engage the face of said disk; means for preventing relative rotation of said shaft and said member; and means for automatically moving said member outwardly on the face of said disk when the speed of the latter is increased.

2. In a device of the class described, the combination of a rotary driving disk; a shaft to be driven; a rotary motion transmitting member slidable on said shaft and adapted to frictionally engage the face of said disk; means for preventing relative rotation of said shaft and said member; and a centrifugal governor connected to said member for automatically moving said member outwardly radially on the face of said disk when the speed of the disk is increased.

3. In a device of the class described, the combination of a rotary driving disk; a shaft to be driven; a rotary motion transmitting member operatively mounted on said shaft and engaging said disk and movable on said shaft lengthwise of the diameter of said disk; means for automatically moving said member outwardly on the face of said disk when the speed of the disk is increased; and means whereby the same is automatically returned to its normal position as the speed is decreased.

4. In a device of the class described, the combination of a rotary driving disk; a shaft to be driven; a sleeve slidably mounted upon said shaft; means for preventing relative rotation of said shaft and said sleeve; means for moving said sleeve longitudinally of said shaft; a rotary motion transmitting member slidably mounted upon said sleeve and adapted to engage said disk; means for preventing relative rotation of said member and said sleeve; a centrifugal governor secured to said sleeve; and means connecting said governor to said motion transmitting member for moving the latter longitudinally of said sleeve.

5. In a device of the class described, the combination of a rotary driving disk; a shaft to be driven; a sleeve slidably mounted upon said shaft; means for preventing relative rotation of said shaft and said sleeve; means for moving said sleeve longitudinally of said shaft; a rotary motion transmitting member slidably mounted upon said sleeve and adapted to engage said disk; means for preventing relative rotation of said member and said sleeve; a centrifugal governor secured to said sleeve; means connecting said governor with said transmitting member for moving the latter longitudinally on said sleeve; and yielding means for opposing this movement on the sleeve.

6. In a device of the class described, the combination of a rotary driving disk; a shaft to be driven; a sleeve slidably mounted upon said shaft; means for preventing relative rotation of said shaft and said sleeve; means for moving said sleeve longitudinally of said shaft; a rotary motion transmitting member slidably mounted upon said sleeve and adapted to co-act with the face of said disk; means for preventing relative rotation of said member and said sleeve; a centrifugal governor secured to said sleeve; means connecting said governor with said transmitting member for moving said member longitudinally of said sleeve; an adjustable collar on said sleeve; and a spring acting between said collar and said transmitting member to oppose the movement of the latter upon the sleeve.

7. In a device of the class described, the combination of a rotary driving disk; a shaft to be driven; a sleeve slidably mounted upon said shaft; means for preventing relative rotation of said shaft and said sleeve; means for moving said sleeve longitudinally of said shaft; a rotary motion transmitting member slidably mounted upon said sleeve and adapted to co-act with the face of said disk; means for moving said disk into and out of operative relation with said member; means for preventing relative rotation of said member and said sleeve; a centrifugal governor secured to said sleeve; and means securing said governor to said motion transmitting member for moving the latter longitudinally of said sleeve.

8. In a device of the class described, the combination of a rotary driving disk; a driven shaft parallel to the face of said disk and having its axis intersecting the axis of revolution of the disk; a sleeve slidably mounted upon said shaft; means for preventing the relative rotation of said shaft and said sleeve; a rotary motion transmitting member slidably mounted upon said sleeve and adapted to co-act with the face of said disk; means for moving said sleeve longitudinally on said shaft to cause said member to engage said disk on either side of the axis of the latter; means for preventing relative rotation of said member and said sleeve; a centrifugal governor keyed to said sleeve; and means connecting said governor with said motion transmitting member for moving the latter longitudinally on said sleeve.

9. In a device of the class described, the combination of a rotary driving disk; a shaft to be driven; a sleeve slidably mounted upon said shaft; means for preventing relative rotation of said shaft and said sleeve; means for moving said sleeve longitudinally of said shaft; a rotary motion transmitting member slidable upon said sleeve and adapted to co-act with the face of said disk; means for preventing relative rotation of said member and said sleeve; a fixed member on said sleeve; a centrifugal governor pivotally connected to said fixed member; means connecting said governor with said transmitting member for moving the latter longitudinally of said sleeve; a collar adjustably movable on said sleeve and located between said fixed member and said transmitting member; and a spring acting between said collar and said transmitting member to oppose the action of said governor.

Signed by me at 4 Post Office Sq., Boston, Mass., this 11th day of February, 1911.

ALBERT A. LAPOINTE.

Witnesses:
WALTER E. LOMBARD,
NATHAN C. LOMBARD.